United States Patent

Haga et al.

Patent Number: 5,833,422
Date of Patent: Nov. 10, 1998

[54] PUSH NUT

[75] Inventors: Yoshiaki Haga; Ken'ichi Miyoshi; Fumio Nakazima; Yoshinobu Katsuno, all of Nagano-ken, Japan

[73] Assignee: Topy Fasteners, Ltd., Matsumoto, Japan

[21] Appl. No.: 886,260

[22] Filed: Jul. 1, 1997

[30] Foreign Application Priority Data

Jul. 29, 1996 [JP] Japan .................................. 8-216096

[51] Int. Cl.⁶ .................................................. F16B 21/18
[52] U.S. Cl. ............................ 411/526; 411/520; 411/521
[58] Field of Search ................................... 411/525, 526, 411/527, 521, 520, 437, 519

[56] References Cited

U.S. PATENT DOCUMENTS

| 2,275,058 | 3/1942 | Draving ................................... 411/521 |
| 2,321,157 | 6/1943 | Rees ........................................ 411/521 |
| 2,986,060 | 5/1961 | Lifka ....................................... 411/521 |
| 4,318,498 | 3/1982 | Magers .................................... 411/521 |

FOREIGN PATENT DOCUMENTS

| 748948 | 5/1956 | United Kingdom .................. 411/521 |
| 1036103 | 7/1966 | United Kingdom .................. 411/527 |

*Primary Examiner*—Flemming Saether
*Attorney, Agent, or Firm*—Wenderoth, Lind & Ponack, L.L.P.

[57] ABSTRACT

A push nut formed of an annular rim and an elastic prong member having a fragile portion capable of being easily bent with a pushing force can be easily engaged with a rod-shaped article such as a shaft, consequently to firmly secure the rod-shaped article onto a frame of an electrical appliance or the like. The fragile portion of the prong member is formed by one or more slots, thin-walled parts, or grooves. The push nut engaged with the rod-shaped article can easily be disengaged by pressing down the prong member with a cylindrical tool to bend the prong member at the fragile portion, so that the rod-shaped article can be freed from the frame of the electrical appliance with little damage and can be reused effectively.

14 Claims, 4 Drawing Sheets

PUSH NUT

BACKGROUND OF THE INVENTION

1. Field of the Invention

This invention relates to an improvement in a push nut for securing a shaft, rod and so forth, which is widely used in household electrical appliances, precision machinery and the like, onto a frame or chassis of the appliance, and more particularly to a push nut capable of being readily engaged with and disengaged from the shaft or rod to enable the shaft or rod to be reused.

2. Description of the Prior Art

A conventional push nut is generally composed of an elastic circular spring rim having a central hole, and a prong member formed by blade pieces extending aslant centripetally from the spring rim. The push nut is readily engaged with a rod-shaped article such as a rotary shaft merely by forcibly inserting the rod-shaped article forcibly into the central hole of the push nut. When thrusting the rod-shaped article into the central hole of the push nut, the blade pieces of the prong member are resiliently bent and partially cut into the rod-shaped article.

In a case that an electrical appliance is misassembled or the rod-shaped article used in the appliance or the like is required to be reused, the push nut must be disengaged from the rod to detach the rod-shaped article from the appliance. However, the push nut firmly fastened in the rod-shaped article is not easily removed. Even if the push nut is disengaged from the rod-shaped article, the rod-shaped article is damaged in most cases, consequently to render reuse of the rod-shaped article impossible.

OBJECT OF THE INVENTION

An object of the present invention is to provide a push nut capable of being easily engaged with and disengaged from a rod-shaped article with little damages to the rod-shaped article, thus to allow the rod-shaped article to be reused.

Another object of the invention is to provide a push nut capable of being used independently for firmly securing the rod-shaped article without using a washer or any other parts.

Still another object of the invention is to provide a simple and reliable push nut which is easy to handle and can be easily produced at a low cost.

SUMMARY OF THE INVENTION

To attain the objects described above according to the present invention, there is provided a push nut comprising an annular flat rim of elastic material, and a prong member shaped substantially as a truncated cone. The prong member is formed of a plurality of blade pieces separated circumferentially by notches, each having a fragile portion at the same height. The push nut has an axial hole defined by the blade pieces so as to tightly receive a rod-shaped article such as a shaft.

The fragile portion of the prong member may be formed by at least one slot or thin-walled part extending circumferentially.

The rod-shaped article thrust into the axial hole in the push nut is firmly retained by the blade pieces so as to be fixed onto a frame or chassis of an electrical appliance or the like.

By forcibly pressing down the blade pieces with a cylindrical tool having a larger diameter than that of the rod-shaped article, the blade pieces are bent outwardly at their fragile portions to bring the rod-shaped article to a free state. Thus, the rod-shaped article can be freed from the push nut and the frame or chassis with little damage thereto by the push nut, and can be reused.

Other and further objects of this invention will become obvious upon an understanding of the illustrative embodiments about to be described or will be indicated in the appended claims, and various advantages not referred to herein will occur to one skilled in the art upon employment of the invention in practice.

DESCRIPTION OF THE PREFERRED EMBODIMENTS

Figure 1:
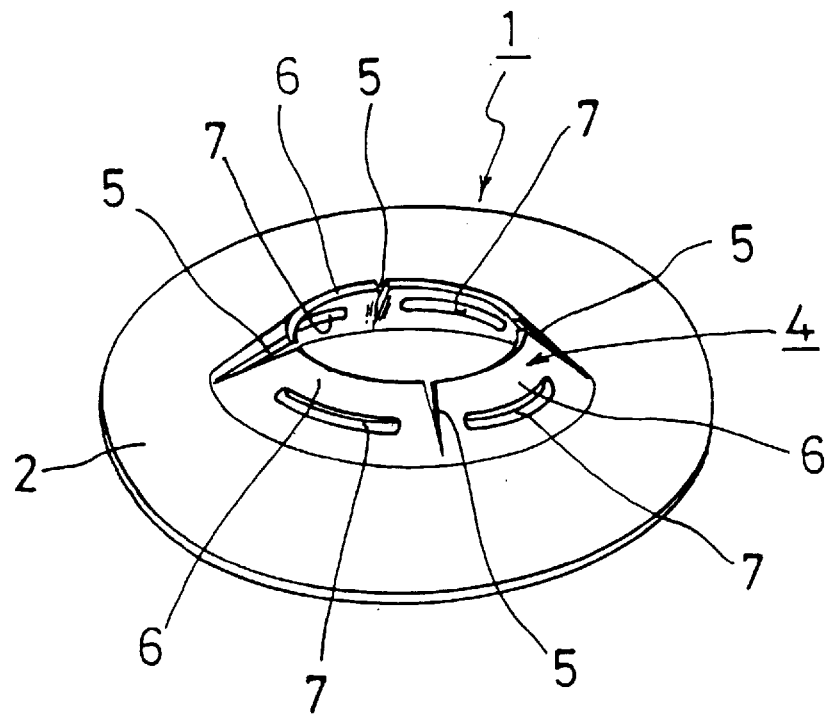
FIG. 1 is a perspective view showing one embodiment of the push nut according to this invention.

The first embodiment of a push nut according to the present invention will be described hereinafter with reference to FIG. 1 through FIG. 4.

The push nut 1 of the invention is formed of material having sufficient elasticity and comprises an annular flat rim 2, and a prong member 4 shaped substantially as a truncated cone. That is to say, the prong member 4 is formed of a plurality of blade pieces 6 separated circumferentially by notches 5 and slanted upwardly.

The prong member 4 has an axial hole 3 defined by the inner ends of the blade pieces 6 so as to tightly receive a rod-shaped article. The prong member 4 in this embodiment is divided into the four blade pieces 6, but the number into which the prong member 4 is divided should not be understood as limitative.

Each blade piece 6 has a fragile portion 7 which is formed by a slot extending circumferentially in this embodiment. Namely, the slots in the blade pieces 6 are aligned intermittently in the circumferential direction around the axial hole 3 and are situated at the same height from the rim 2. The slots are spaced circumferentially from the notches 5.

Figure 2:
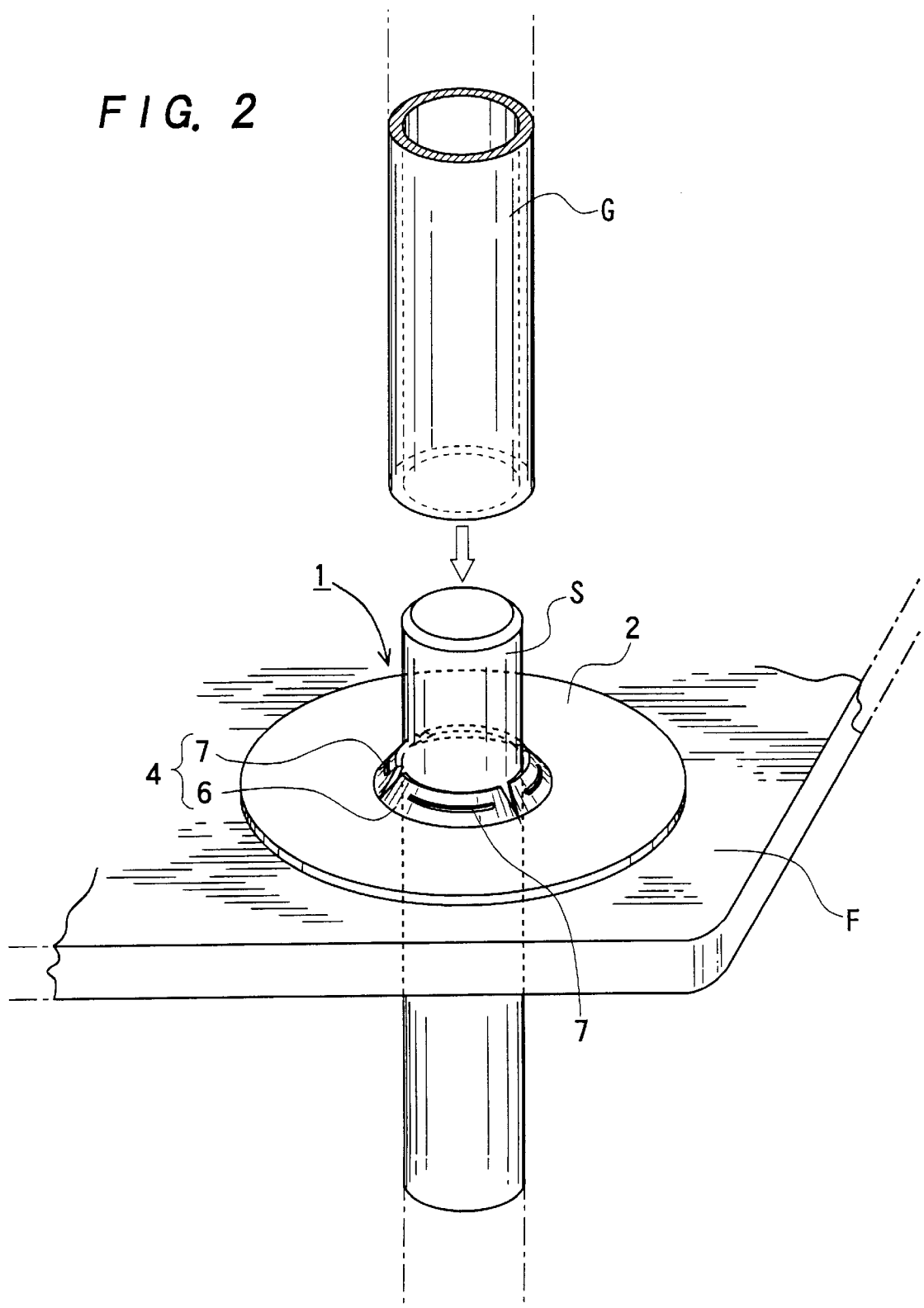
FIG. 2 is a perspective view showing the state in which a rod-shaped article is retained by the push nut of this invention.

As shown in FIG. 2, when securing a rod-shaped article S such as a shaft onto a frame or chassis F of an electric appliance or other implement by using the push nut 1 of the invention, the end of the rod-shaped article S may be merely thrust into the axial hole 3 of the push nut 1. By forcibly thrusting the rod-shaped article S into the axial hole 3, the blade pieces 6 are resiliently bent, while slightly cutting into the rod-shaped article S. As a result, the rod-shaped article S is firmly engaged with the frame or chassis F of the appliance.

In a case of disengaging the rod-shaped article S, there may be used a cylindrical tool G as shown in FIG. 2, which has an inner diameter somewhat larger than the diameter of the rod-shaped article S. Particularly, the mean diameter obtained from the inner and outer diameters of the cylindrical tool G may be substantially equal to the diameter of a circle defined by the circumferential slots forming the fragile portions 7 aligned around the central hole 3.

Figure 3:
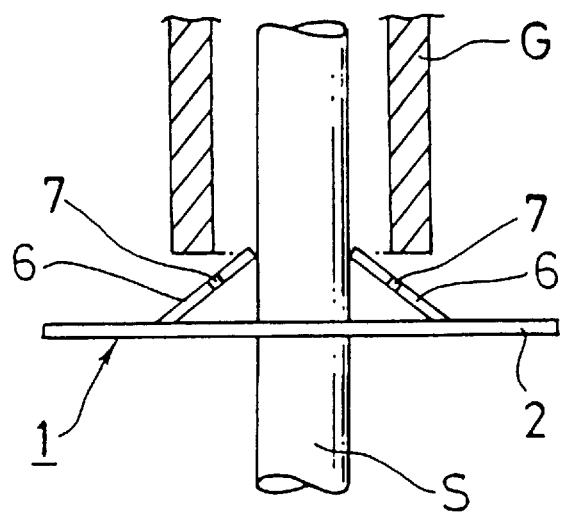
FIGS. 3 and 4 are side views showing the manner of disengaging the rod-shaped article from the push nut of the invention.
Figure 4:
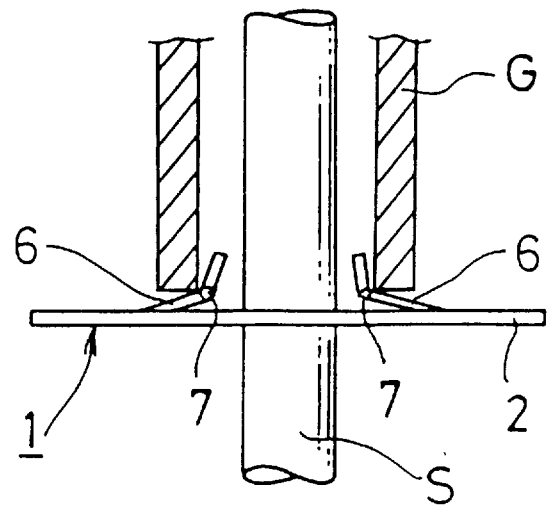

By pressing down the blade pieces 6 with the cylindrical tool G while admitting the end portion of the rod-shaped article S as shown in FIG. 3, the blade pieces 6 are forced outwardly at their fragile portions 7 as shown in FIG. 4, consequently freeing the rod-shaped article S from the frame or chassis F of the appliance. The fragile portion is located, to enable the forced outward bending during removal, is located at a positon spaced from the outer and inner edges of the blade piece, e.g. midway therebetween as illustrated. S is easily freed from the frame or chassis F with little damaged thereto and thus, can be reused.

Although each blade piece 6 in the first embodiment as described has one slot for forming the fragile portion 7, the number of the slots is not specifically limited. The blade piece 6 may be provided with two or more slots for forming the fragile portion 7.

Figure 5:
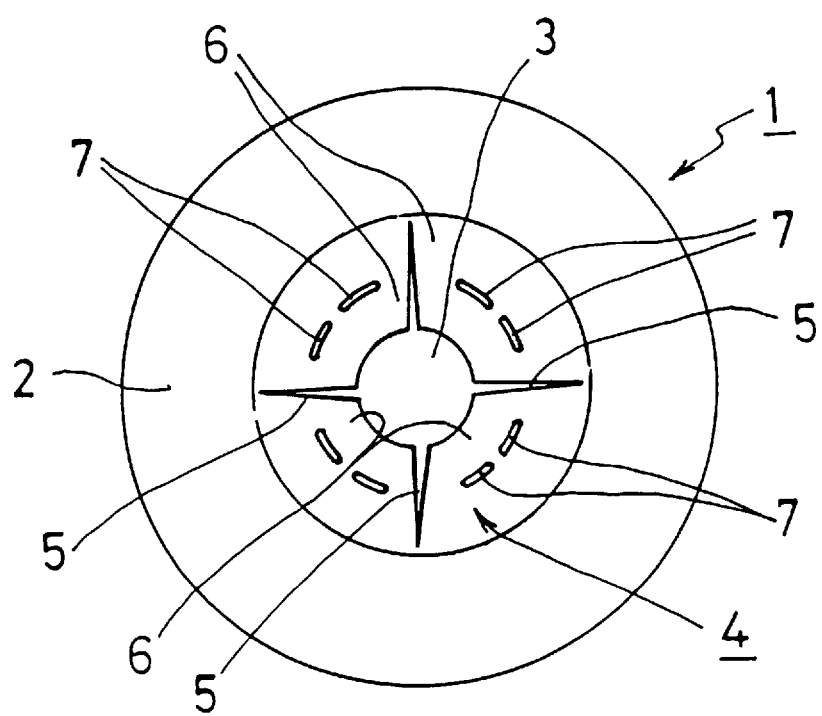
FIG. 5 is a plan view showing another embodiment of this invention.

As illustrated in FIG. 5 as one instance, each blade piece 6 may be provided with two slots so as to form the fragile portion 7. Similarly to the foregoing embodiment, the slots in the blade pieces 6 are aligned intermittently in the circumferential direction, thus forming the fragile portion 7 of the push nut 1 as a whole. This push nut of FIG. 5 has substantially the same function of permitting the blade pieces 6 to be easily bent to bring the rod-shaped article to its free state.

Figure 6:
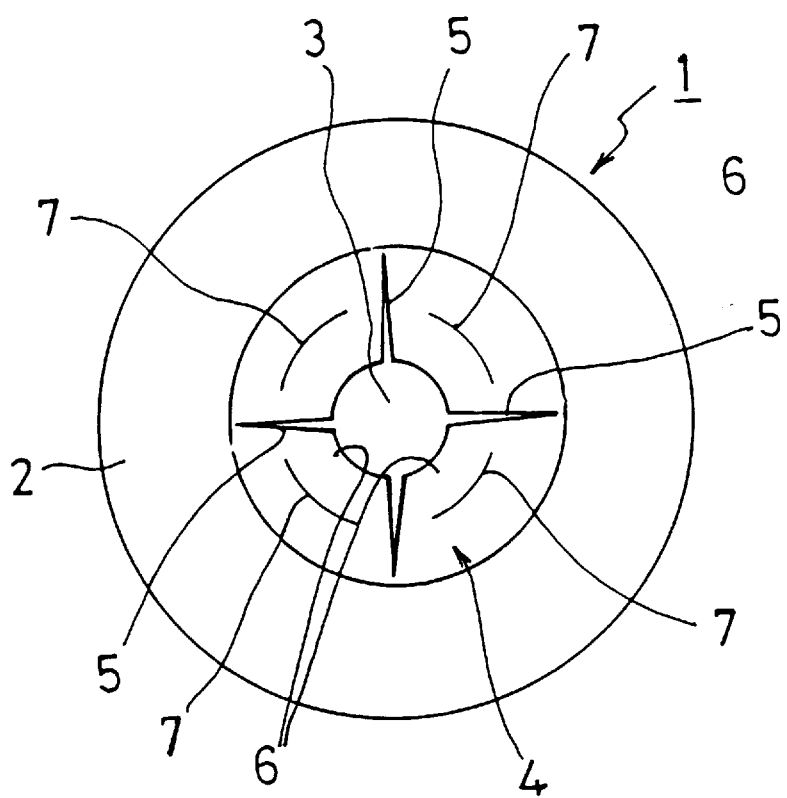
FIG. 6 is a plan view showing still another embodiment of this invention.

Instead of the slot for the fragile portion 7, the blade piece 6 may be provided with at least one thin-walled part or groove as shown in FIG. 6. Also in this embodiment, by pressing down the prong member 4 with the cylindrical tool, the blade pieces 6 are easily bent outwardly at the fragile portion 7 formed by the thin-wall part, consequently to bring the rod-shaped article to the free state and facilitate disengaging of the rod-shaped article from the frame or chassis of the appliance.

That is, the fragile portion 7 of the push nut of the invention may be made by forming one or more slots, slits, grooves, thin-walled, bent and any other structure capable of weakening the prong member 4 in part.

As is apparent from the foregoing description, the push nut having the annular flat rim and the elastic prong member shaped substantially as a truncated cone can be easily fitted on a rod-shaped article such as a shaft or rod, consequently to firmly secure the rod-shaped article onto a frame or chassis of an electrical appliance, precision machinery and the like by a remarkably simple operation. Furthermore, the push nut can easily be disengaged from the rod-shaped article by forcibly pressing down the prong member formed of the blade pieces with a cylindrical tool, so that the rod-shaped article secured onto the frame or chassis can easily be freed from the push nut and the frame or chassis of the appliance with little damaged to the article, and reused effectively. The push nut of the invention easily can be independently used without using a washer or any other parts with ease, and can be produced at a low cost.

It is to be understood that the invention is not limited in its application to the details of construction and arrangement of parts illustrated in the accompanying drawings, since the invention is capable of other embodiments and of being practiced or carried out in various ways. Also it is to be understood that the phraselogy or terminology employed herein is for the purpose of description and not of limitation.

What is claimed is:

1. A push nut comprising:
   an annular rim;
   a prong member extending from said annular rim, said prong member having a substantially truncated conical shape and having therethrough an axial hole for tightly receiving a rod-shaped article, and said prong member being formed of blade pieces circumferentially separated by respective notches; and
   each said blade piece having a radially outer edge extending from said annular rim and a radially inner edge at said axial hole, and each said blade piece including a fragile portion at which said blade piece may be bent, said fragile portion being located at a position spaced from said notches and both said outer edge and said inner edge of said blade piece.

2. A push nut as claimed in claim 1, wherein said position of said fragile portion of each said blade piece is midway between said inner and outer edges thereof.

3. A push nut as claimed in claim 1, wherein said fragile portion of each said blade piece comprises a circumferentially extending slot.

4. A push nut as claimed in claim 3, wherein said slots of all of said blade pieces are located at an equal height from said annular rim and are aligned circumferentially.

5. A push nut as claimed in claim 1, wherein said fragile portions of all of said blade pieces are located at an equal height from said annular rim and are aligned circumferentially.

6. A push nut as claimed in claim 1, wherein said fragile portion of each said blade piece comprises at least two circumferentially spaces and aligned slots.

7. A push nut as claimed in claim 1, wherein said fragile portion of each said blade piece comprises at least one circumferentially extending thin-wall part of said blade piece.

8. A push nut formed of elastic material and comprising:
   a flat annular rim;
   a prong member extending from said annular rim, said prong member having a substantially truncated conical shape and having therethrough an axial hole for tightly receiving a rod-shaped article, and said prong member being formed of blade pieces circumferentially separated by respective notches; and
   each said blade piece having a radially outer edge extending from said flat annular rim and a radially inner edge at said axial hole, and each said blade piece including a fragile portion by which said blade pieces easily are bendable by application to said fragile portions of an axial force, each said fragile portion being located at a position spaced from said notches and both said outer edge and said inner edge of the respective said blade piece.

9. A push nut as claimed in claim 8, wherein said position of said fragile portion of each said blade piece is midway between said inner and outer edges thereof.

10. A push nut as claimed in claim 8, wherein said fragile portion of each said blade piece comprises a circumferentially extending slot.

11. A push nut as claimed in claim 10, wherein said slots of all of said blade pieces are located at an equal height from said flat annular rim and are aligned circumferentially.

12. A push nut as claimed in claim 8, wherein said fragile portions of all of said blade pieces are located at an equal height from said annular rim and are aligned circumferentially.

13. A push nut as claimed in claim 8, wherein said fragile portion of each said blade piece comprises at least two circumferentially spaces and aligned slots.

14. A push nut as claimed in claim 8, wherein said fragile portion of each said blade piece comprises at least one circumferentially extending thin-wall part of said blade piece.

* * * * *